United States Patent
Letz et al.

(10) Patent No.: US 9,654,911 B2
(45) Date of Patent: May 16, 2017

(54) METHOD AND APPARATUS FOR PROVIDING LOCATION SHARING VIA SIMULATION

(75) Inventors: Dominic Letz, Berlin (DE); Paul Chambers, Sunnyvale, CA (US)

(73) Assignee: HERE GLOBAL B.V., Veldhoven (NL)

( * ) Notice: Subject to any disclaimer, the term of this patent is extended or adjusted under 35 U.S.C. 154(b) by 871 days.

(21) Appl. No.: 13/599,998

(22) Filed: Aug. 30, 2012

(65) Prior Publication Data

US 2014/0062790 A1 Mar. 6, 2014

(51) Int. Cl.
| | |
|---|---|
| *G01S 1/08* | (2006.01) |
| *H04W 4/02* | (2009.01) |
| *H04L 29/08* | (2006.01) |
| *H04W 4/20* | (2009.01) |
| *G08G 1/01* | (2006.01) |
| *G08G 1/00* | (2006.01) |
| *H04L 12/58* | (2006.01) |
| *H04L 12/18* | (2006.01) |
| *G01C 21/36* | (2006.01) |

(52) U.S. Cl.
CPC ............. *H04W 4/02* (2013.01); *G08G 1/012* (2013.01); *G08G 1/0112* (2013.01); *G08G 1/0129* (2013.01); *G08G 1/0141* (2013.01); *G08G 1/202* (2013.01); *H04L 51/20* (2013.01); *H04L 51/32* (2013.01); *H04L 67/1095* (2013.01); *H04L 67/14* (2013.01); *H04W 4/028* (2013.01); *H04W 4/20* (2013.01); *H04W 4/206* (2013.01); *G01C 21/3617* (2013.01); *H04L 12/189* (2013.01)

(58) Field of Classification Search
CPC ......... G01S 1/08; H04L 51/32; H04L 12/189; H04L 67/1095; H04L 67/14; G01C 21/3617; H04W 4/028; H04W 4/20; H04W 4/206
USPC ....................................................... 342/386
See application file for complete search history.

(56) References Cited

U.S. PATENT DOCUMENTS

| | | | |
|---|---|---|---|
| 6,236,357 B1 | 5/2001 | Corwith | |
| 6,801,850 B1 | 10/2004 | Wolfson | |
| 8,498,817 B1* | 7/2013 | Erdmann | ............ G01C 21/3617 |
| | | | 701/468 |
| 2003/0097485 A1* | 5/2003 | Horvitz | ................. G06F 21/335 |
| | | | 719/313 |
| 2008/0125959 A1* | 5/2008 | Doherty | ............ G06F 17/30241 |
| | | | 701/532 |
| 2009/0319172 A1 | 12/2009 | Almeida et al. | |
| 2011/0153629 A1* | 6/2011 | Lehmann | ............... G06Q 10/06 |
| | | | 707/758 |
| 2012/0271717 A1* | 10/2012 | Postrel | ................... G06Q 30/02 |
| | | | 705/14.58 |
| 2013/0079028 A1* | 3/2013 | Klein | ..................... G08G 1/207 |
| | | | 455/456.1 |
| 2014/0024354 A1* | 1/2014 | Haik | ..................... G01S 5/0018 |
| | | | 455/418 |

FOREIGN PATENT DOCUMENTS

| | | |
|---|---|---|
| WO | 2004/111677 A1 | 12/2004 |
| WO | 2007/074208 A1 | 7/2007 |
| WO | 2009/019672 A1 | 2/2009 |

OTHER PUBLICATIONS

International Search Report and Written Report for corresponding Patent Application No. PCT/EP2013/056881 mailed Oct. 1, 2013, 15 pages.
Civils, A. et al. "Efficient Tracking of Moving Objects with Precision Guarantees." Mobile and Ubiquitos Systems: Networking and Services, 2004. MOBIQUIT OUS 2004. The First Annual International Conference on Boston, MA, U.S.A., Aug. 22-26, 2004, Piscataway, NJ, U.S.A., IEEE, Aug. 22, 2004, pp. 164-173, XP010721031, DOI: 10.1109/MOBIQ.2004.1331723, ISBN: 978-0-7695-2208-1, Chapters 2.1 and 2.2; pp. 165-166, paragraph "Definition 3.7"; pp. 167, right-hand column, Chapter 5.2; p. 169, right-hand column—p. 170, left hand column.
Tiesyte, D. et al. "Efficient Cost-Based Tracking of Scheduled Vehicle Journeys." Mobile Data Management, 2008. MDM '08. 9th International Conference on, IEEE, Piscataway, NJ, U.S.A., Apr. 27, 2008, pp. 9-16, XP031248664, ISBN: 978-0-7695-3154-0, Chapter 1; p. 9, left-hand column—p. 10, left-hand column, Chapter 2; p. 10, left-hand column—p. 12, right-hand column; figure 1, first two paragraphs of Chapter 3; p. 12, right-hand column.
Rothermel, K. et al. "Context-Aware and Quality-Aware Algorithms for Efficient Mobile Object Management." Pervasive and Mobile Computing, Elsevier, NL, vol. 8, No. 1, Apr. 15, 2011, pp. 131-146, XP028448044, ISSN: 1574-1192, DOI: 10.1016/J.PMCJ.2011.04.009 [Retrieved on Jun. 16, 2011] Chapter 2; pp. 132-133, Chapter 4.1 and 4.2; pp. 134-135, Chapter 5.3; pp. 140-141.

(Continued)

*Primary Examiner* — Harry Liu
(74) *Attorney, Agent, or Firm* — Ditthavong & Steiner, P.C.

(57) ABSTRACT

An approach for providing location sharing via simulation is disclosed. A location sharing platform determines at least one location point associated with at least one device and at least one algorithm for determining at least one predicted route of the at least one device based, at least in part, on the at least one location point. The location sharing platform then causes, at least in part, a transmission of the at least one location point and the at least one algorithm to at least one other device for generating location tracking information.

20 Claims, 12 Drawing Sheets

(56) References Cited

OTHER PUBLICATIONS

Qin, G. et al. "Prediction Model for Tiered Accuracy Requirements in Large-Scale Object Tracking Sensor Networks." Computer and Information Technology (CIT), 2010 IEEE 10th International Conference on, IEEE, Piscataway, NJ, U.S.A., Jun. 29, 2010, pp. 2643-2648, XP031757709, ISBN: 978-1-4244-7547-6, Chapter II, Introduction, II-A and II-B; p. 2644, right-hand column—p. 2645, right-hand column, Chapter III, Introduction; p. 2646, left-hand column, Chapter III-C, p. 2647, left-hand column, Chapter V; p. 2648, left-hand column.

\* cited by examiner

METHOD AND APPARATUS FOR PROVIDING LOCATION SHARING VIA SIMULATION

BACKGROUND

Service providers and device manufacturers (e.g., wireless, cellular, etc.) are continually challenged to deliver value and convenience to consumers by, for example, providing compelling location-based applications and services. One area of development has been location sharing and tracking among a group of devices. For example, with the rise of social platforms (e.g., Twitter, Facebook, Foursquare, and the like), three is an increasing need to share a user's current position with the user's friends, families, and other contacts. In many cases, users may elect to transmit both the user's current location as well as information to track the user's movements or travels. For example, two friends can find each other in an unfamiliar area using a map display and each other's device to track and view each other's current locations. However, traditional location or positioning solutions can rely on constant location updates over the air interface to enable such location sharing or tracking, thereby potentially causing significant resource usage (e.g., data traffic, processing, and power) on both client and network devices. As a result, device manufacturers and service providers face significant technical challenges to enabling location sharing while minimizing associated resource burdens.

SOME EXAMPLE EMBODIMENTS

Therefore, there is a need for an approach for providing location sharing via simulation or prediction of location information, for instance, to reduce the potential need to transmit location updates.

According to one embodiment, a method comprises determining at least one location point associated with at least one device and at least one algorithm for determining at least one predicted route of the at least one device based, at least in part, on the at least one location point. The method further comprises causing, at least in part, a transmission of the at least one location point and the at least one algorithm to at least one other device for generating location tracking information.

According to another embodiment, an apparatus comprises at least one processor, and at least one memory including computer program code for one or more computer programs, the at least one memory and the computer program code configured to, with the at least one processor, cause, at least in part, the apparatus to determine at least one location point associated with at least one device and at least one algorithm for determining at least one predicted route of the at least one device based, at least in part, on the at least one location point. The apparatus further causes a transmission of the at least one location point and the at least one algorithm to at least one other device for generating location tracking information.

According to another embodiment, a computer-readable storage medium carries one or more sequences of one or more instructions which, when executed by one or more processors, cause, at least in part, an apparatus to determine at least one location point associated with at least one device and at least one algorithm for determining at least one predicted route of the at least one device based, at least in part, on the at least one location point. The apparatus further causes a transmission of the at least one location point and the at least one algorithm to at least one other device for generating location tracking information.

According to another embodiment, an apparatus comprises means for determining at least one location point associated with at least one device and at least one algorithm for determining at least one predicted route of the at least one device based, at least in part, on the at least one location point. The apparatus further comprises means for causing, at least in part, a transmission of the at least one location point and at least one algorithm to the at least one other device for generating location tracking information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating one or more personalized routes for travel based on calculated and recorded route experience information are disclosed. In the following description, for the purposes of explanation, numerous specific details are set forth in order to provide a thorough understanding of the embodiments of the invention. It is apparent, however, to one skilled in the art that the embodiments of the invention can be practiced without these specific details or with an equivalent arrangement. In other instances, well-known structures and devices are shown in block diagram form in order to avoid unnecessarily obscuring the embodiments of the invention.

Figure 1A:
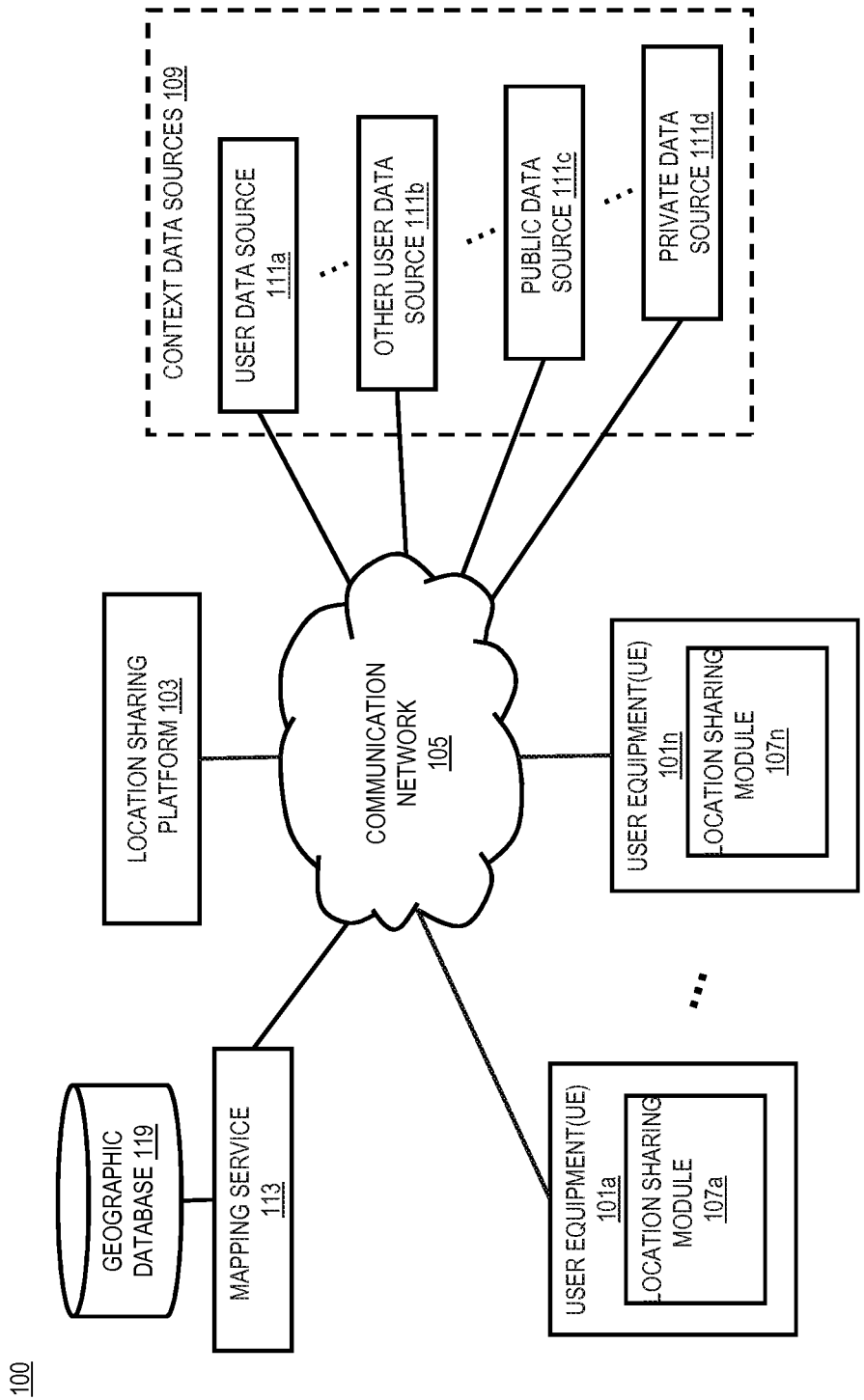
FIG. 1A is a diagram of a system capable of providing location sharing via simulation, according to one embodiment.

FIG. 1A is a diagram of a system capable of providing location sharing via simulation, according to one embodiment. As noted previously, location sharing and tracking (e.g., via social networks) is becoming increasingly popular among users. However, tracking or sharing a user's current location or position from a mobile device is often problematic, for instance, with respect to latency, battery consumption, bandwidth, processing resources, and the like. For example, there are mobile applications that enable users to share their current position with friends, family, or other contacts (e.g., to meet each other at a certain place, or to drive multiple cars to same destination in a so called "caravanning" process).

In many of these applications, location sensors (e.g., GPS sensors) are used for positioning and produce new location information at various time intervals. For example, in the highest accuracy scenarios, these location measurements can be sent every second (e.g., or even higher frequencies) from the application to one or more "listening" applications. In one embodiment, these location sharing communications usually are facilitated by a central server over the Internet. In some cases, the location sharing communications may also be exchanged among devices using peer-to-peer protocols. In either case, when sending information (e.g., location information) at such frequencies or rates (e.g., every second or faster), resource consumption can be significant. In turn, this resource consumption can affect or be detrimental to available device resources such as: (1) processing resources—device processor has less time to handle other processing tasks; (2) bandwidth resources—user pays more for data traffic, device antenna is always on, less bandwidth for other tasks; (3) battery resources—high processor load and/or high antenna use depletes batteries more quickly; and (4) latency or location information age—latency can be high if the location push interval includes both upstream and downstream transmission delays.

To address at least these problems, a system 100 of FIG. 1 introduces the capability of providing location sharing via simulation whereby a location route is simulated or predicted for a device that is sharing its location information (e.g., a client device, a sending device, etc.). In one embodiment, the system 100 transmits location updates for the sharing device to other devices (e.g., a server device, a receiving device, etc.) when the sharing device deviates from the simulated or predicted route. In this way, the system 100 advantageously reduces the frequency at which a sharing device transmits its location updates, resulting in a corresponding decrease in resource usage or burden.

In one embodiment, the system 100 synchronizes or causes the sharing device to transmit its location update by specifying a current location and an algorithm for predicting or simulating a route to be taken by the sharing device from the current location. Once the sharing device and the receiving device have the current location and/or algorithm for predicting the travel route, the sharing device and the receiving device can, for instance, incrementally estimate the sharing device's current position over time based on the information (e.g., current location point) passed from the sharing device to the receiving device. In one embodiment, the sharing device and receiving the device use the same algorithm to determine location information (e.g., location tracking or sharing information) for the sharing device. In one embodiment, if the sharing device detects that it's actual or current position differs from the position estimated by the algorithm by more than some accepted amount of error, then the sharing device updates the receiving device with new starting conditions (e.g., new location points and/or algorithms).

In one embodiment, the system 100 sends the starting location points and/or algorithms for determining location tracking information for a sharing device as single data object. In one embodiment, the data object is referred to as a position plan that includes the information (e.g., starting location point and/or algorithm) for predicting or simulating the sharing device's location tracking information (e.g., predicted route).

In one embodiment, the system 100 enables the sharing device to predict one or more future location points and/or times the sharing device is expected to reach the future location points. The sharing device then generates the position plan to include its current location and/or the predicted future location points. In this way, the sharing device need not include or specify a route prediction algorithm in the position plan. Instead, the receiving device can, for instance, calculate a route or location of the sharing device based on the location points included in the position plan. As with the embodiments described above, the sharing device can monitor its actual position relative to the positions or locations in the position plan. If there is a deviation between the actual position and the position plan, the sharing device can recalculate is predicted or simulate future location points and update the position plan for transmission to the receiving device.

By way of example, the route of the sharing device can be well-known or planned ahead (e.g., when traveling via highway or schedule-based transport such as public transport, airlines, etc.). Accordingly, the system 100 need not constantly or frequently update the location tracking information for a sharing device because the route (e.g., including timing of travel on the route) can be simulated or predicted using the algorithms discussed with respect to the various embodiments described herein.

In one embodiment, the system 100 can use contextual information associated with the sharing device, the predicted route of the sharing device, or a combination thereof to determine the algorithm selected for predicting or simulating the sharing device's route. In another embodiment, the system 100 can also use the contextual information as parameters for the algorithm to predict the route and/or location tracking information of the sharing device. For example, contextual information such as speed limits, predicted speed, type of vehicle, mode of transport, etc. can be used to simulate or predict the sharing device's route. In one embodiment, contextual information from other users (e.g., crowd sourced travel data) can also be used by the system 100. By way of example, this crowd-sourced information may include travel times on certain travel or road segments (e.g., driving from Sunnyvale, Calif. to San Francisco, Calif. usually takes one hour with one stop). In other words, the simulation or prediction algorithms may be intelligent algorithms that take into account any and/or all contextual information, historical information, and/or any other relevant information for predicting the sharing device's route or location tracking information.

As previously noted, in one embodiment, the same simulation or prediction algorithm runs or executes on both the sharing device and the receiving device (e.g., in a client that is being followed, and at clients who are following the sharing device). In one embodiment, the receiving device may be a server device that relays the location tracking information from the server to the other clients who are following the sharing device. In one embodiment, the simulation or prediction algorithm can be synchronized between the sharing device and the receiving device separately from the starting location of the sharing device. For example, the algorithm or algorithms can be kept synchronized between the devices, e.g., once a day, at predefined intervals, manually, etc. In this case, the when the sharing device transmits location information or a position plan to initiate location sharing or tracking, the sharing device and receiving device can use a pre-synchronized algorithm.

In one embodiment, where there are multiple algorithms, either or both of the sharing device and the receiving device may select a prediction or simulation algorithm to use. In another embodiment, selection between differing prediction algorithms (e.g., by either the sharing or receiving device) can be based on contextual information (e.g., based on road map, rail map, dead reckoning, previously learned routes such as commute routes, means or mode of transportation, etc.). This enables the client device to apply intelligence to select an optimum prediction or simulation algorithm for a given context. For example, if the sharing device is traveling by rail, the railway timetable for an identified train may be employed as well as the route of the track to predict the sharing device's route and progress along the route.

In another embodiment, the system 100 enables automatic selection of the route being predicted based on contextual information such as patterns of behavior or historical travel patterns (e.g., commute at a fairly consistent time-of-day). This route selection may also be tied into real-time information such as traffic alerts for delays along that route. For example, the prediction algorithm can be configured to learn and/or consider delays arising from traffic alerts such as accidents. In some embodiments, traffic feeds or alerts can include expected durations which can be considered by the prediction or simulation algorithm to more accurately model the sharing device's predicted route.

In one embodiment, the user or the sharing device may also stop at some point along the predicted route (e.g., gas station or fast food place). The system 100 enables the prediction or simulation algorithm to account for the stop using, for instance, one update to notify the receiving device of the stop. The algorithms at the sharing device and the receiving device may then make a prediction about the stop. For example, the algorithms may assume a certain stoppage pattern for a given category of the stop, such as 20 typical stop at a fast food restaurant. Other contextual parameters about the stop may also be used to refine the prediction. For example, if it is detected that the fast food restaurant is full of customers (e.g., detected by WiFi signaling or reported by an owner of the fast food restaurant, then the algorithm may predict a longer delay. Then, as usual, only deviations (e.g., beyond a certain threshold) from the predicted stop are reported to adjust the prediction or simulation for location sharing or tracking.

In one embodiment, the prediction or simulation algorithm may predict arrival times for the sharing device based on current progress against existing travel time data. By way of example, the existing travel time data can include, at least in part: (1) aggregated historical travel times for that route; (2) historical travel time for that route under specific contexts, e.g., time of day, season, weather, events, etc.; (3) crowd-sourced data from other users passing through the segments of the route at approximately the same time; and (4) the user's or the sharing device's own historical data on the route.

In one embodiment, the system 100 can use contextual triggers to initiate location sharing or tracking. The system 100, for instance, can process information associated with a user or the user's device (e.g., user calendar appointments, historical trip habits such as commute habits, etc.) to initiate or recommend initiation of location sharing by the device. For example, if the commute habits indicate that a user typically begins his or her commute to work at 8 AM every weekday, the user's device can automatically initiate location sharing in support of the commute. In one embodiment, the location sharing can be directed to applications, services, and/or other devices (e.g., devices associated with family or friends). For example, one application or service can use the location tracking information to correlate point-of-interest information along the predicted route to pending location-based tasks (e.g., "to do items"). In another example, the system 101 may initiate location sharing to an internet-based service. The service may then send related information (e.g., estimated time of arrival, traffic warnings along the predicted route, etc.) to the sharing device.

In one embodiment, the algorithm can also utilize public and private data sources of contextual information (e.g., public or private traffic information, weather conditions, road conditions, etc.). For example, nearby users or devices may share information about local traffic conditions to either the server side or the client side. This information can then be synchronized between the sharing device and the receiving device so that the algorithms at the devices can be dynamically updated.

As shown in FIG. 1, the system 100 comprises one or more user equipment (UE) 101a-n (also collectively referred to as UEs 101) having connectivity to a location sharing platform 103 over the communication network 105. In one embodiment, the location sharing platform 103 interacts with the UEs 101 to provide location sharing or tracking using simulation or prediction of travel routes as discussed with respect to the various embodiments described herein. In addition or alternatively, the UEs 101a-101n may be configured with respective location sharing modules 107a-107n (also collectively referred location sharing modules 107. In one embodiment, it is contemplated that the location sharing modules 107 may perform all or a portion of the functions associated with the location sharing platform 103. In one embodiment, the location sharing platform 103 and/or the location sharing modules 107 interact with the context data sources 109 to determine contextual information associated with one or more UEs 101 that are sharing location information with other UEs 101 or the location sharing platform 103 itself for use in predicting or simulating a route for the sharing UE 101.

By way of example, the context data sources 109 include user data source 111a, other user data source 111b, public data source 111c, and private data source 111c. More specifically, the user data source 111a includes contextual information associated with the user of the sharing UE 101. For example, user data source 111a may include user contextual information, user historical travel information, user behavior travel patterns, user behavior patterns, etc. Similarly, the other user data source 111b may include contextual information obtained from other users that can be used for predicting the location tracking information for the sharing UE 101. For example, other user data source 111b may include crowd-sourced travel information, contextual information, traffic information, route preferences, travel times, etc. In one embodiment, public data source 111c includes information available from public information sources that are relevant to predicting or simulating location tracking information for the sharing UE 101. For example, public data source 111c may include weather information, traffic information, road conditions, etc. The private data source 111d includes information for predicting or simulating route information from proprietary databases, premium databases, or other databases that restrict access.

In on embodiment, the system 100 (e.g., via the location sharing platform 103 and/or the location sharing modules 107) predict or simulate routes for the sharing UE 101 based on contextual information determined from the context data sources 109. For example, contextual information may indicate a purpose or category of the simulated route such as whether the route is for pleasure, work, shopping, etc. Each context or category, for instance, can be associated with different respective simulated routes and/or algorithms for generating the simulated routes. In other embodiments, the system 100 may select potential routes for simulation based on usage characteristics of the potential routes such as age or frequency determined from the context data sources 109. For example, older routes may not reflect user preferences as accurately as new routes. Similarly, more frequently traveled routes may more accurately reflect user preference than less frequently traveled routes. Accordingly, the system 100 can apply various selection or weighting schemes or algorithms to determine which potential routes or route segments to select for simulating a route to determine location tracking information for a sharing UE 101.

In one embodiment, the location sharing platform 103 and/or the location sharing modules 107 access mapping information, recorded route information, or user preference context information, for example, provided by the mapping service 113, such as in conjunction with the geographic database 119. For example, the mapping service 113 may provide one or more routing algorithms to predict or simulate routes associated with a sharing UE 101 to determine location tracking information. By way of example, the mapping service platform 113 together with the geographic database 119, as well as the route determination platform 111 and context data sources 109 can exist independently or within a cloud computing and/or cloud storage platform, for example, according to exemplary embodiments.

By way of example, the communication network 105 of system 100 can include one or more networks such as a data network, a wireless network, a telephony network, or any combination thereof. It is contemplated that the data network can be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network can be, for example, a cellular network and can employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the location sharing platform 103, the location modules 107, the context data sources 109, the mapping service 113, and the associated geographic database 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the location sharing modules 107 and the location sharing platform 103 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 1B:
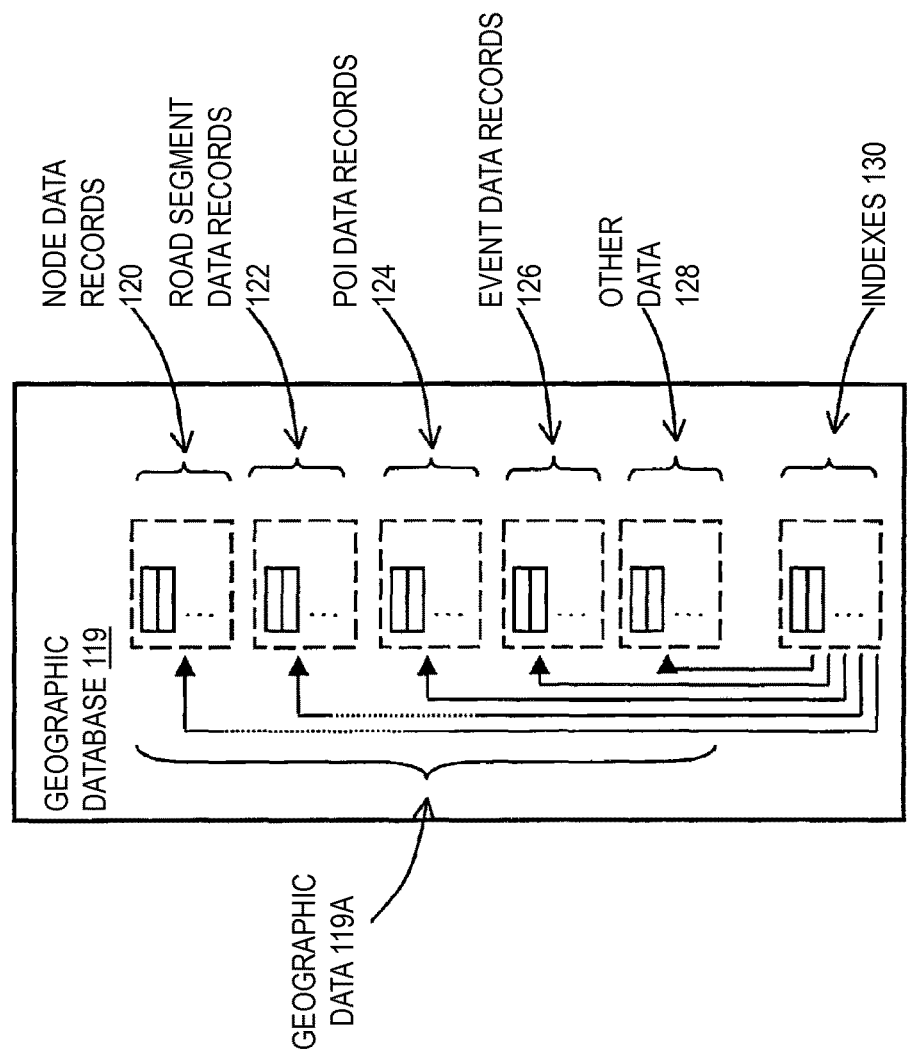
FIG. 1B is a diagram of a geographic database, such as can be included in the system of FIG. 1A, according to one embodiment.

FIG. 1B is a diagram of geographic database 119 of system 100, according to exemplary embodiments. In the exemplary embodiments, generated route predictions and simulations as well as POIs, event data, context information, or recorded route data can be stored, associated with, and/or linked to the geographic database 119 or data thereof. In one embodiment, the geographic or map database 119 includes geographic data 119A used for (or configured to be compiled to be used for) navigation-related services, such as for predicting or simulating routes for determining location tracking information, according to exemplary embodiments. For example, the geographic database 119 includes node data records 120, road segment or link data records 122, POI data records 124, event data records 126, and other data records 128, for example. More, fewer or different data records can be provided. In one embodiment, the other data records 128 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 122 are links or segments representing roads, streets, or paths, as can be used in the calculated route or recorded route information for determination of one or more predicted or simulated routes, according to exemplary embodiments. The node data records 120 are end points corresponding to the respective links or segments of the road segment data records 122. The road link data records 122 and the node data records 120 represent a road network, such as used by vehicles, cars, and/or other entities. Alternatively, the geographic database 119 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 124. The geographic database 119 can also include data about places, such as cities, towns, or other communities, and other geographic features, such as bodies of water, mountain ranges, etc. Such place or feature data can be part of the POI data 124 or can be associated with POIs or POI data records 124 (such as a data point used for displaying or representing a position of a city). In addition, the geographic database 119 can include data about location-based events and their respective locations in the event data records 126. By way of example, the location-based events can include any type of event that is associated with a particular location including, for instance, traffic, accidents, construction, public gatherings, etc., as can be used as context information for personalized route determination, according to exemplary embodiments. In one embodiment, the event data records 126 can be used to update the prediction or simulation algorithms for determining location tracking information.

The geographic database 119 can be maintained by the content provider in association with the mapping service platform 113 (e.g., a map developer). The map developer can collect geographic data to generate and enhance the geographic database 119. There can be different ways used by the map developer to collect data. These ways can include obtaining data from other sources, such as municipalities, respective geographic authorities, or crowd-source contributors. In addition, the map developer can employ field personnel to travel by vehicle along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database 119 or data in the master geographic database 119 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101*a*-*n*, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 119 can represent a compiled navigation database that can be used in or with end user devices (e.g., UEs 101) to provided navigation-related functions. For example, the geographic database 119 can be used with the end user device 101 to provide an end user with location sharing via route prediction and/or simulation. In such a case, the geographic database 119 can be downloaded or stored on the end user device UE 101*a*-*n*, such as in the location sharing modules 107, or the end user devices (e.g., UEs 101) can access the geographic database 119 through a wireless or wired connection (such as via a server and/or the communication network 105), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for location sharing and/or other navigation functions such as guidance and map display, for example, and for determination of one or more predicted routes or route segments based on one or more calculated and recorded routes, according to exemplary embodiments.

Figure 2:
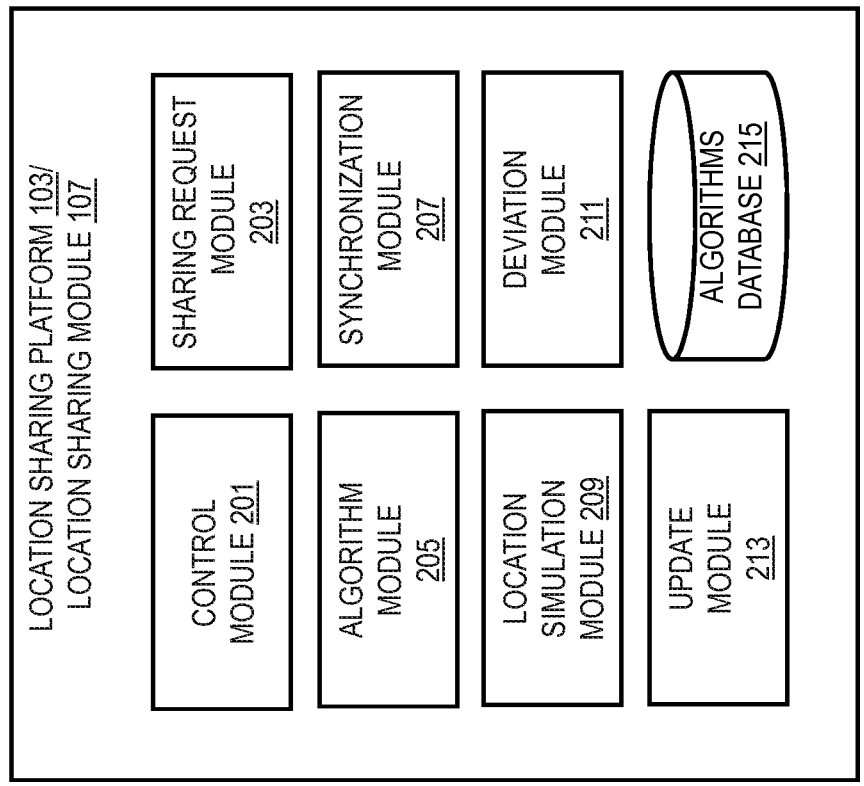
FIG. 2 is a diagram of a location sharing platform or module, according to one embodiment.

FIG. 2 is a diagram of the components of a location sharing platform 103 or a location sharing module 107, according to one embodiment. By way of example, the location sharing platform 103 and/or the location sharing module 107 includes one or more components for providing location sharing via simulation or prediction. In one embodiment, the location sharing platform 103 is a network side server, and the location sharing module 107 is a client side component resident on, for instance, the UE 101. It is contemplated that the functions of these components may be combined in one or more components or performed by other components of equivalent functionality. In this embodiment, the location sharing platform 103 and/or the location sharing module 107 include a control module 201, a sharing initiation module 203, an algorithm module 205, a synchronization module 207, a location simulation module 209, a deviation module 211, an update module 213, and an algorithms database 215.

In one embodiment, the control module 201 provides the logic for coordinating the tasks associated with location sharing via simulation as discussed with respect to the various embodiments described herein. By way of example, the control module 201 interacts with the sharing initiation module 203 to determine when to initiate location sharing among UEs 101 or between a UE 101 and the location sharing platform 103. In one embodiment, the sharing initiation module 203 may initiate location sharing automatically or manually. More specifically, in an autonomous mode of operation, the sharing initiation module 203 may use contextual triggers to determine when to automatically initiate location sharing. For example, the sharing initiation module 203 may consult the UE 101's calendar and/or look at user information such as historical trip habits to determine when it is likely for the user to travel, and then initiate location sharing accordingly. In a manual mode of operation, the sharing initiation module 203 may receive a request for location sharing from the sharing user, following user, location-based applications/services, and/or any other entity or component that may want location tracking or sharing information from a device.

In one embodiment, the sharing initiation module 203 identifies the sharing UE 101 (e.g., the UE 101 whose location information is to be shared or tracked) and the receiving UEs 101 (e.g., one or more UEs 101 that are following or tracking the sharing UE 101). In addition, the sharing initiation module 203, for instance, may cause the sharing UE 101 to transmit one or more location points (e.g., location points indicating a starting position and/or predicted locations) of the sharing UE 101 for tracking.

In one embodiment, the sharing initiation module 203 may also indicate a default algorithm or interact with, for instance, the algorithm module 205 to select an appropriate algorithm for simulating or predicting a route for determining location tracking information. In one embodiment, the algorithm module 205 may use contextual information associated with the sharing UE 101 such as mode of transportation, environmental conditions, user preferences, user history, and the like to select from among different prediction or simulation algorithms. For example, if the sharing UE 101 is associated with a user who is walking in an urban or city center, the algorithm module 205 may select an algorithm that considers travel parameters or factors that are most relevant to the context such as available walking paths, available crosswalks, size of sidewalks, number of other walkers expected, etc. In one embodiment, the algorithm module 205 may determine the context or situation of the sharing UE 101 by utilizing sensors including, for instance, location-based technologies (GPS receivers, cellular triangulation, A-GPS, etc.) to determine location, temporal, and/or other contextual information regarding the sharing UE 101. In particular, the contextual information can include the personal travel patterns associated with the UEs 101, a user of the UEs 101, or a combination thereof to determine one or more of the user's travel paths, one or more places of interest, or a combination thereof.

In one embodiment, the algorithm module 205 may interact with the synchronization module 207 to synchronize the prediction algorithms among the sharing UE 101, the receiving UEs 101, and/or the location sharing platform 103. In one embodiment, the synchronization module 207 can pre-synchronize or configure one or more default or general algorithms at the sharing UE 101, the receiving UEs 101, and/or the location sharing platform 103. The default algorithms may, for instance, be used when the algorithm module 205 does not or cannot (e.g., because of lack of available contextual information) determine a context-specific algorithm. In other embodiments, the synchronization module 207 synchronizes the most appropriate prediction algorithms as they are determined by the algorithm module 205. In yet other embodiments, the synchronization module 207 may synchronized the prediction algorithms occasionally at pre-determined intervals (e.g., once a day) or manually on demand from a user. In one embodiment, the prediction algorithms determined by the algorithm module 205 and/or synchronized by the synchronization module 207 may be stored in the algorithms database 215 or other equivalent data store.

Following algorithm selection and/or synchronization, the location simulation module 209 can initiate location sharing and/or tracking of the sharing UE 101 by predicting and/or simulating a predicted route of the sharing UE 101 using the appropriate prediction algorithm. By way of example, the predicted route can include both the route a sharing UE 101 is expected to travel as well as the time it is expected to take the UE 101 to traverse the predicted route. The route and the time for the route can be predicted or simulated based on contextual information as previously described. In one embodiment, the location simulation module 209 enables execution of various algorithms for generating predicted or simulated routing information in connection with associated contextual information, mapping information, routing data generated by the mapping service 113 and the like. In some embodiments, the predicted or simulated routes can be further based, at least in part, on calculated and recorded route or location information. For example, the starting location points of the sharing UE 101 can be used to seed or initiate the processing of the algorithms to simulate a route for determining location tracking information for the sharing UE 101. By way of example, algorithmic executions performed can include a processing of user specified input or parameters for enabling the gathering/retrieving of route or other experience information from the various context data sources 109. Another execution can include a processing of input or parameters for generating one or more predicted and/or optimal routes, such as based on one or more calculated routes and recorded routes, for example, according to various embodiments. It is noted that the executions for determination of one or more simulated routes or route segments can be performed in connection with or independent of one or more processing techniques of the mapping service 113.

In one embodiment, as part of the algorithmic execution, the location simulation module 205 may process contextual information associated with the sharing UE 10 to construct, for instance, a travel graph and/or prediction model comprising a user's one or more travel paths, one or more places of interest, associated travel times, associated contextual information, or a combination thereof. In one embodiment, the travel graph and/or prediction model may also be based on travel or behavior patterns of the user associated with the sharing UE 101 or from other users (e.g., when using crowd-sourced information). In one embodiment, a travel graph and/or prediction model can be a probabilistic model such as a Bayesian network or Markov network. For example, the location simulation module 209 may make at least one prediction based, at least in part, on a score calculation for the user's one or more travel paths, the user's one or more places of interest, contextual information, etc. that may indicate a likely or probably route. In one embodiment, the score calculation is a likelihood score when using a probabilistic prediction module and a counting score when using a non-probabilistic prediction model.

After the location simulation module 209 predicts or simulates a route for the sharing UE 101, the deviation module 211 can determine whether there are any deviations from the predicted route by the sharing UE 101. In one embodiment, the deviation module 211 can be configured with criteria for determining whether there is a deviation from the planned route. For example, the criteria may include a location accuracy criterion (e.g., 200 meters). In one embodiment, the deviation module 211 periodically determines a current or actual location of the sharing UE 101 for comparison against the predicted or simulated location. For example, if the actual location differs from the predicted or simulated location by more than the accuracy criterion, then deviation module 211 can determine that a deviation has occurred. In one embodiment, the actual location of the sharing UE 101 can be monitored by the device itself. For example, the sharing UE 101 may detect its location and thus any deviation in any of several ways, e.g., GPS, accelerometer, magnetometer, gyroscope, etc. to keep track of relative motion. In some embodiments, the sharing UE 101 may also use local area positioning schemes such as WiFi positioning, low power beacon transmitters, NFC/RFID tags to detect the current location and measure possible deviations from the predicted route.

If a deviation is determined, the deviation module 211 interacts with the update module 213 to cause a transmission of the sharing UE 101s updated actual location and/or updated algorithms for predicting the sharing UE 101's continued travel route. For example, the update includes one or more new starting location points. If a position plan (e.g., a data object including the starting point, predicted future location points, and/or associated prediction algorithms) has been generated, the plan can be updated with the new location points. In one embodiment, the update module 213 can cause an update of the starting location point and/or algorithm at predetermined intervals (e.g., at specific frequencies, according to a schedule) or on demand in addition to or as an alternate to updating based on detecting a deviation.

In one embodiment, the automatic periodic update acts as a keep alive message to ensure that both the sharing UE 101 and the receiving UE 101 remain in an operational state and are still capable of supporting the location tracking service. In one embodiment, the keep alive message may be dedicated keep alive message that does not carry any data payload (e.g., updated location information). By way of example, the interval between the periodic updates or keep alive message may be configured by weighing the increased resource load (e.g., data traffic, etc.) associated with the keep alive messages against the potential for either of the sharing UE 101 or the receiving UE 101 to go offline (e.g., lose power, lose connectivity, etc.).

Figure 3:
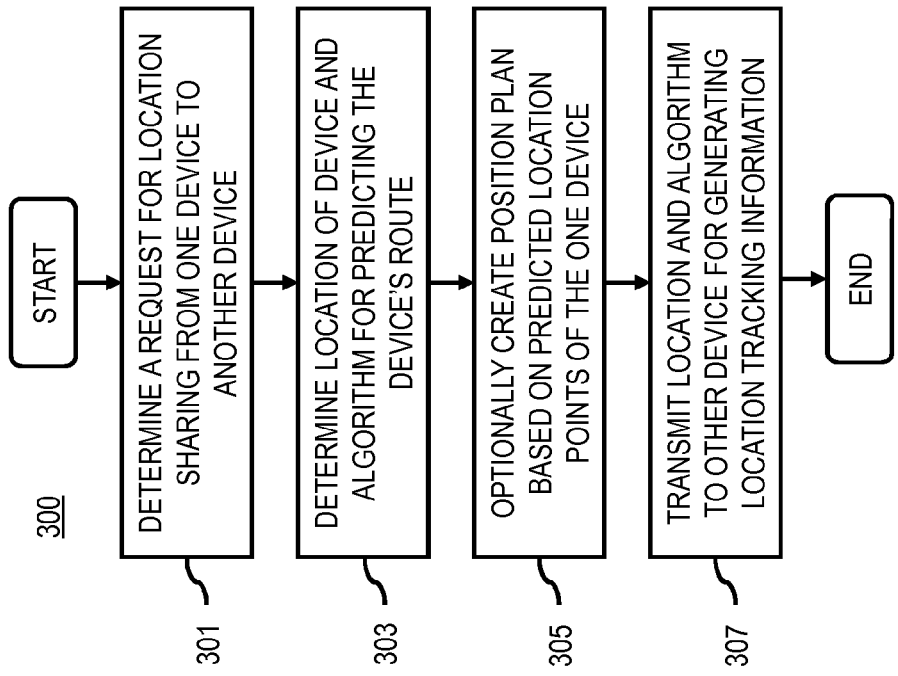
FIG. 3 is a flowchart of a process for providing location sharing via simulation, according to one embodiment.
Figure 8:
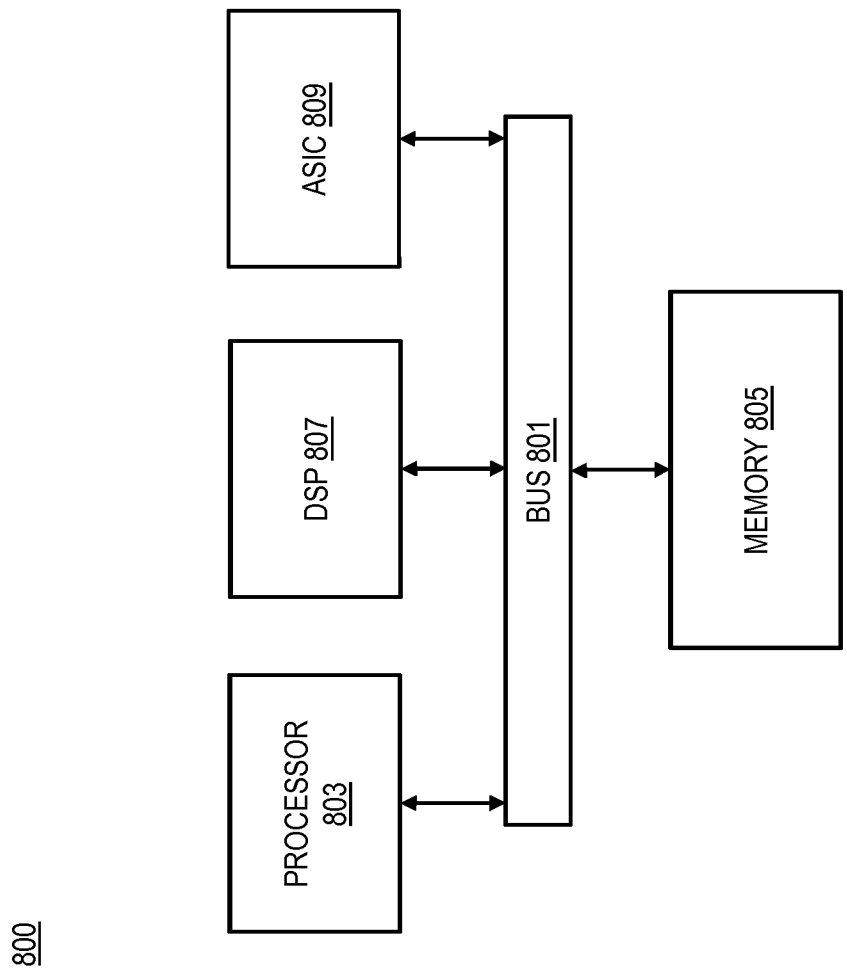
FIG. 8 is a diagram of a chip set that can be used to implement embodiments of the invention.
Figure 9:
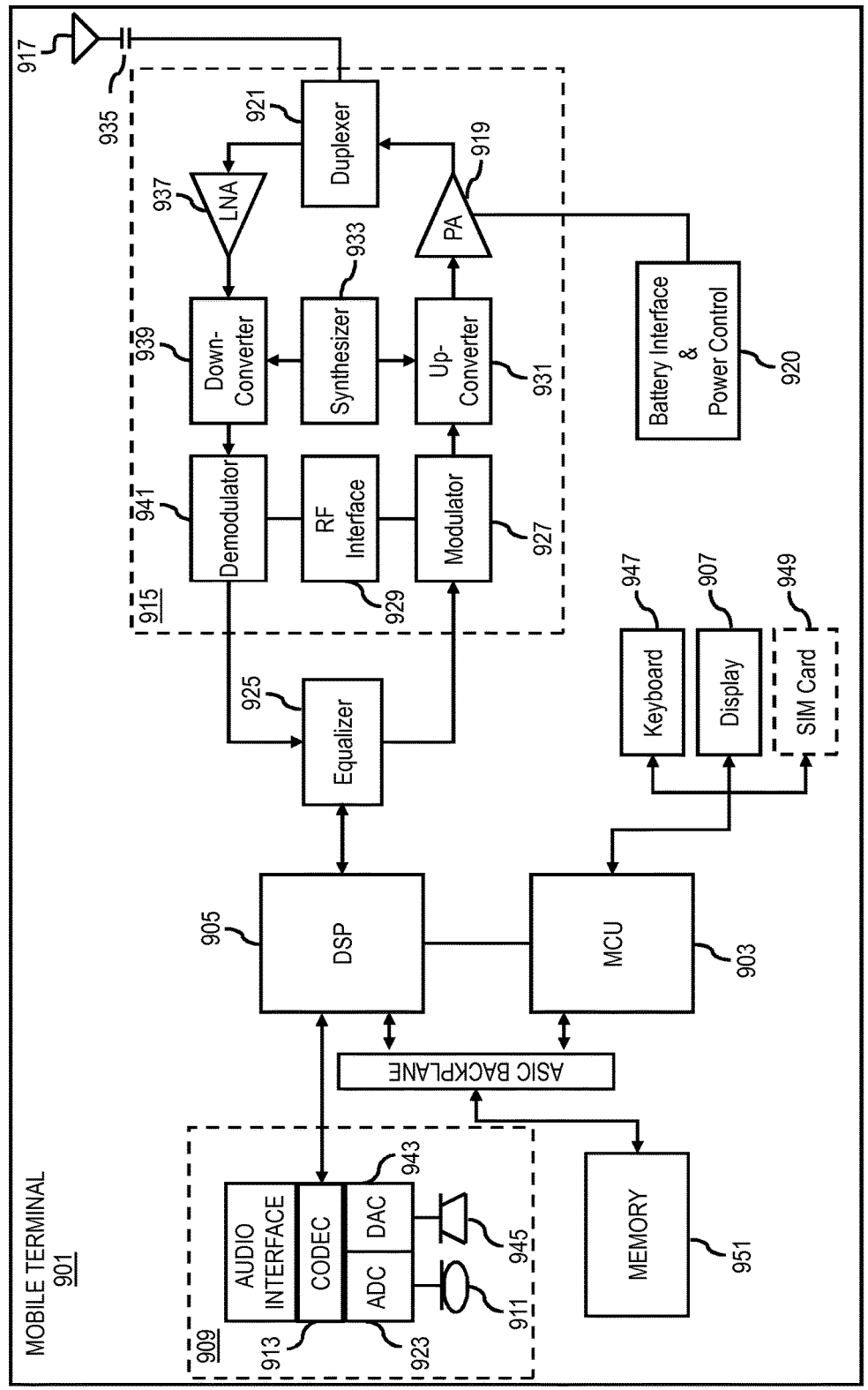
FIG. 9 is a diagram of a mobile terminal (e.g., handset) that can be used to implement embodiments of the invention.

FIG. 3 is a flowchart of a process for providing location sharing via simulation, according to one embodiment. In one embodiment, the location sharing platform 103 performs the process 300 and is implemented in, for instance, a chip set including a processor and a memory as shown in FIG. 8. In addition or alternatively, the location sharing module 107 may perform all or a portion of the process 300.

In step 301, the location sharing platform 103 determines when to initiate sharing of location tracking information of at least one device (e.g., a sharing UE 101) with at least one other device (e.g., receiving UE 101, the location sharing platform 103, or other server component). By way of example, the sharing of location tracking information may be initiated by one or more location-based services or applications executed by the sharing UE 101 and/or the receiving UEs 101. For example, the service or applications may be social networking services or applications that enable real-time location sharing or tracking. Other example applications, include group travel or coordination applications for "caravanning" or visiting expansive points of interests (e.g., theme parks). As previously described, the location sharing platform 103 may also use contextual triggers (e.g., calendar appointments, commute habits, or other location-related behavior patterns) to initiate sharing of location tracking information.

In step 303, the location sharing platform 103 determines at least one location point (e.g., a starting location point) associated with the at least one device (e.g., the sharing UE 101) and at least one algorithm for determining at least one predicted route of the at least one device based, at least in part, on the at least one location point. By way of example, the starting location and/or the algorithm can come from a route planning tools such as navigation applications, mapping applications, etc. In one embodiment, the location sharing platform 103 determines contextual information associated with the at least one device, at least one user associated with the at least one device, or a combination thereof. The location sharing platform 103 then, for instance, determines the at least one algorithm based, at least in part, on the contextual information. In one embodiment, the contextual information includes, at least in part, mode of travel information, travel history information, user behavior information, traffic information, crowd-sourced information, or a combination thereof. In other words, the location sharing platform 103 can determine or dynamically adapt route prediction algorithms to account for contexts of the user. This dynamic adaptation enables the location sharing platform 103, for instance, to more accurately model a user's predicted route, thereby resulting in fewer errors and fewer location updates.

In one embodiment, the location sharing platform 103 optionally creates a position plan based on the predicted location points of the sharing device (step 305). By way of example, the position plan provides a data object for encapsulating the data (e.g., starting location points and/or algorithms) for predicting or simulating a user's route for generating location tracking information. It is contemplated that the position plan is flexible and can include combination of the seed location points and/or algorithms for predicting routes based on the seed location points. In one embodiment, the position plan includes the at least one location point and the algorithm for processing the location.

In another embodiment, the position plan may include a set of location points predicted for the sharing UE 101 without including an algorithm. In this case, the sharing UE 101 acts as a "travel prediction apparatus" that simulates an expected route and picks a number of the predicted location points from the simulated route to include in the position plan. In one embodiment, the location sharing platform 103 (e.g., on behalf of the sharing UE 101) processes and/or facilitates a processing of the at least one location point and the at least one algorithm to determine one or more predicted location points for that least one device at one or more time points. The location sharing platform 103 then causes, at least in part, a generation of a position plan specifying the at least one location point, the one or more predicted location points, or a combination thereof. In one embodiment, the location sharing platform 103 causes, at least in part, a transmission of the position plan to the at least one other device for generating the location tracking information in place of or in addition to the at least one algorithm. In this example, the at least one other device is the receiving UE 101 which receives the position plan and acts as a location calculation apparatus. For example, the receiving UE 101 can use the predicted location points in the position plan as well as the current time to calculate the current position of the sharing UE 101.

In step 307, the location sharing platform 103 causes, at least in part, a transmission of the at least one location point and the at least one algorithm to the at least one other device for generating the location tracking information. On receiving the at least one location point and the at least one algorithm, the receiving UE 101 possesses the information to predict the location of the sharing UE 101 for generating and displaying tracking information for the sharing UE 101. In addition, because the tracking and displaying computations take place locally at the receiving UE 101, the location tracking and displaying functions are not affected by network latency or availability issues. Moreover, the receiving UE 101 is able to determine the senders current position at any wanted precision (e.g., seconds, subseconds, minutes, etc.) and any level of smoothness of the route for display.

In one embodiment, the receiving UE 101 may be associated with an internet-based service. On receipt of the at least one location point, the at least one algorithm, and/or position plan, the service may return information relevant to the predicted route. In one use case, the service may provide route related information such as estimated time of arrival (ETA), traffic warnings along the predicted route, etc. In another use case, more complex services may provided such as correlating POI information along the predicted route to pending tasks and recommending POIs or stops along the predicted route to complete those tasks.

Figure 4:
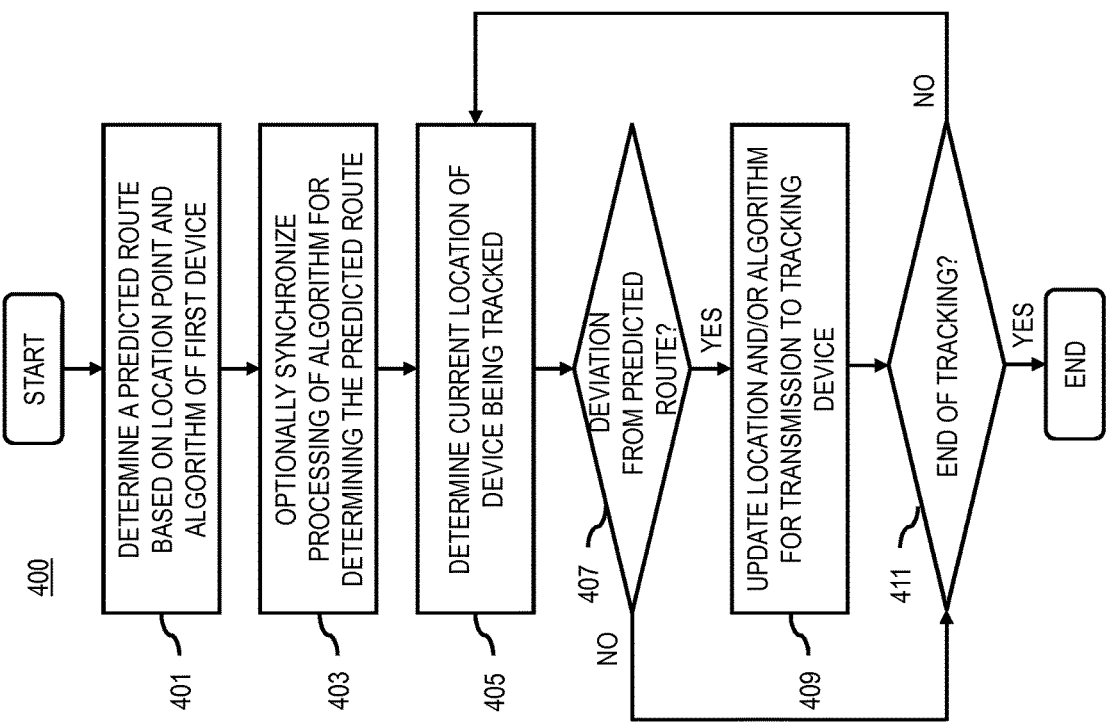
FIG. 4 is a flowchart of a process for updating location sharing by detecting a deviation for a predicted routed, according to one embodiment.

FIG. 4 is a flowchart of a process for updating location sharing by detecting a deviation for a predicted routed, according to one embodiment. In one embodiment, the location sharing platform 103 performs the process 400 and is implemented in, for instance, a chip set including a processor and a memory as shown in FIG. 8. In addition or alternatively, the location sharing module 107 may perform all or a portion of the process 400.

In step 401, the location sharing platform 103 processes and/or facilitates a processing of the at least one location point and the at least one algorithm (e.g., received from the sharing UE 101) to determine the at least one predicted route. In one embodiment, the location sharing platform 103 optionally causes, at least in part, a synchronization of a processing of the at least one location point, the at least one algorithm, or a combination thereof between the at least one device and the at least one other device (step 403). By way of example, synchronizing the processing of the algorithm across the sharing UE 101 and the receiving UE 101 helps to ensure that the sharing UE 101's progress along the route is also synchronized in time.

As previously discussed, the location sharing platform 103 can account of contextual information of the sharing UE 101 when determining the predicted route. For example, in one embodiment, the contextual information includes mode of travel information. In this case, the location sharing platform 103 can determine that the model of travel information indicates that the at least one device is using at least one schedule-based mode of travel. The location sharing platform 103 then determines one or more travel schedules for the at least one schedule-based mode of travel as at least one parameter of the at least one algorithm. For example, train schedules, bus schedules, plan schedules, etc. can be used to provide timing and route information for schedule-based modes of transport. In addition, modes of travel that rely on predetermined schedules often also rely on fixed routes (e.g., buses normally travel along a fixed route from stop to stop). Accordingly, the location sharing platform 103 can leverage this information to further refine the accuracy of the predicted or simulated route.

In another embodiment, the location sharing platform 103 can use predicted arrival times as part of its route prediction or simulation. For example, the location sharing platform 103 determines one or more endpoints of the at least one predicted route and then causes, at least in part, an estimation of at least one arrival time at the one or more endpoints. In one embodiment, the predicted arrival times can be based on historical travel information specific to the user or a community of users. In other embodiment, the arrival times can determined based on crowd-sourced travel times collected from users or devices traveling along the predicted route or route segment within a recent time period. Next, the location sharing platform 103 causes, at least in part, an update of the location tracking information, the at least one location point, the at least one algorithm, or a combination thereof based, at least in part, the estimation of the at least one arrival time.

In step 405, the location sharing platform 103 determines the current or actual location point of the at least one device being tracked, and then determines whether there is a deviation of the current location point from the predicted route. As previously, discussed the location sharing platform 103 can determine the deviation based on criteria such as an accuracy criteria. If yes, the location sharing platform 103 determines at least one deviation of at least one current location point of the at least one device from that at least one predicted route, and causes, at least in part, a transmission of an update of the at least one location point, the at least one algorithm, or a combination thereof based, at least in part, on the at least one current location point (step 409).

In one embodiment, the location sharing platform 103 determines that the at least one deviation is caused, at least in part, by a stop, a detour, or a combination thereof of the at least one device. The location sharing platform 103 causes, at least in part, an estimation of a duration of the stop, the detour, or a combination based, at least in part, contextual information associated with the stop, the detour, or a combination thereof. As discussed above, information regarding duration of stops and/or detours can be collected from the user or multiple users to predict the duration based on, for instance, the type of stop or detour that has occurred. For example, collected data may indicate that a typical gas stop on a Friday afternoon takes approximately 10 minutes, whereas a stop at the grocery store on a Friday afternoon takes approximately 30 minutes. Other contextual information about the stop (e.g., number of people, weather, etc.) can also be used to estimate the duration of potential stops. In this case, the update of the at least one location point, the at least one algorithm, or a combination thereof based, at least in part, on the estimation of the duration.

If there is no deviation, the location sharing platform 103 determines whether tracking has ended (step 411). If tracking has not ended, the location sharing platform 103 returns to step 405 to continue monitoring the sharing device's actual location and repeats the deviation evaluation process of steps 407-409. The process ends when tracking has ended (e.g., expired or stopped by a user).

Figure 5:
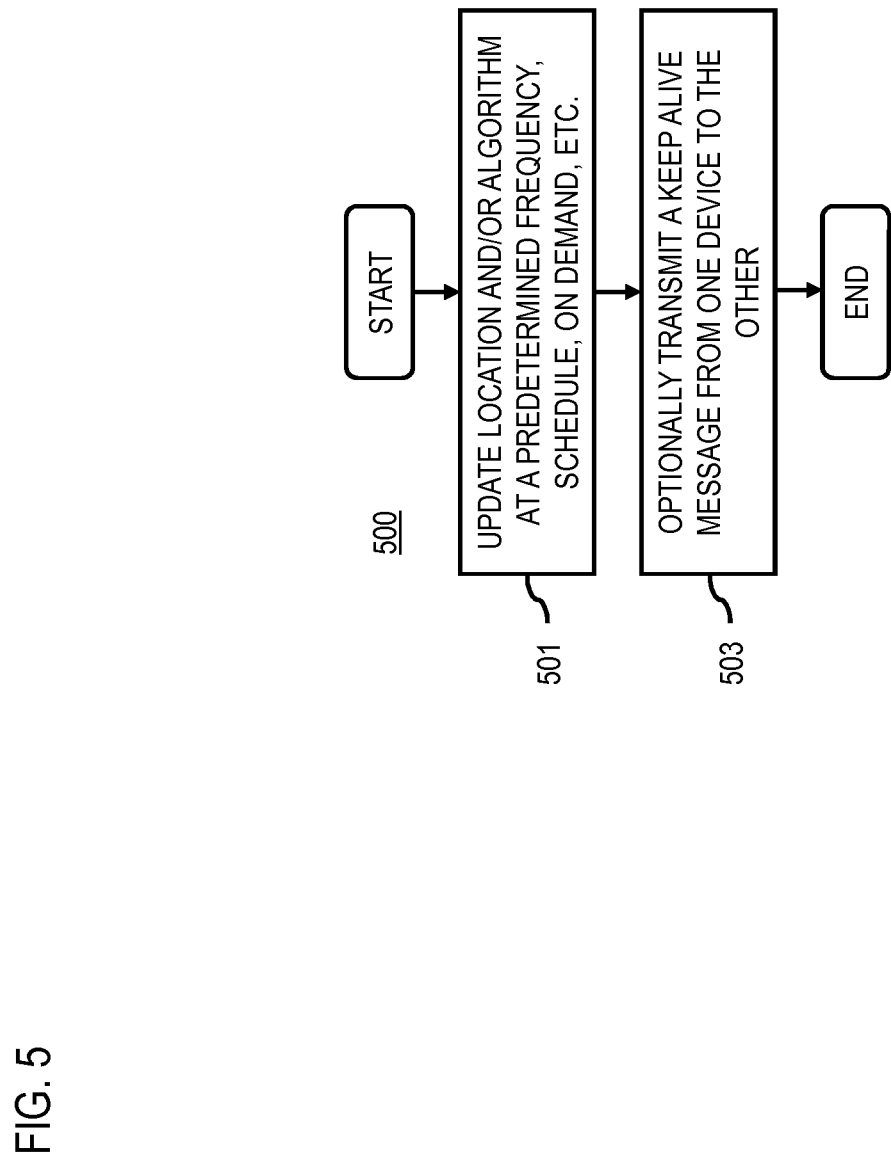
FIG. 5 is a flowchart of a process for updating location sharing by frequency, schedule, and/or on demand, according to one embodiment.

FIG. 5 is a flowchart of a process for updating location sharing by frequency, schedule, and/or on demand, according to one embodiment. In one embodiment, the location sharing platform 103 performs the process 500 and is implemented in, for instance, a chip set including a processor and a memory as shown in FIG. 8. In addition or alternatively, the location sharing module 107 may perform all or a portion of the process 500.

In step 501, the location sharing platform 103 causes, at least in part, an update of the at least one location point, the at least one algorithm, or a combination thereof at a predetermined frequency, according to a schedule, on demand, or a combination thereof. In one embodiment, the location sharing platform 103 updates the position plan periodically even in the absence of any detected deviation to avoid potential misinformation in cases where one user has lost connectivity for too long.

In step 503, the location sharing platform 103 optionally transmits a keep alive message from the sharing device to the receiving device to address the problem of potential connectivity loss. In this case, the keep alive signal can be decoupled from the location update information or position plan. The sharing UE 101 and/or the receiving UE 101 can exchange keep alive messages (e.g., small data size messages) to maintain the location sharing or tracking relationship.

In one embodiment, the timing of the periodic update or the keep alive message can be set to balance network resource load against the potential loss of connectivity. In some embodiments, the location sharing platform 103 can set a plan timeout or expiration time for the location tracking information. Accordingly, if no updated plan or keep alive message is received before the plan timeout or expiration the position plan is no longer valid, and the UEs 101 will cease the location sharing or tracking relationship.

Figure 6A:
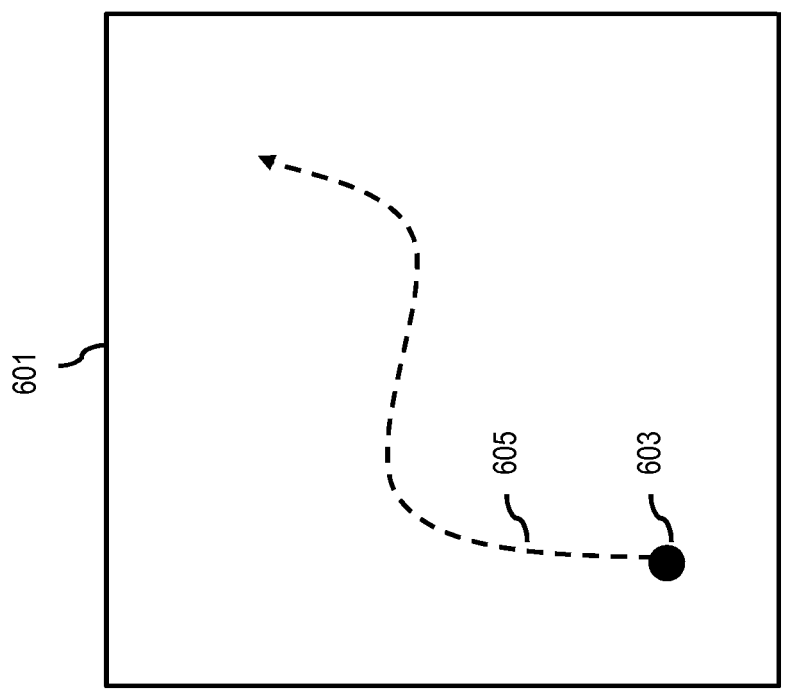
FIGS. 6A-6C are diagrams illustrating the process for providing location sharing via simulation, according to various embodiments.
Figure 6B:
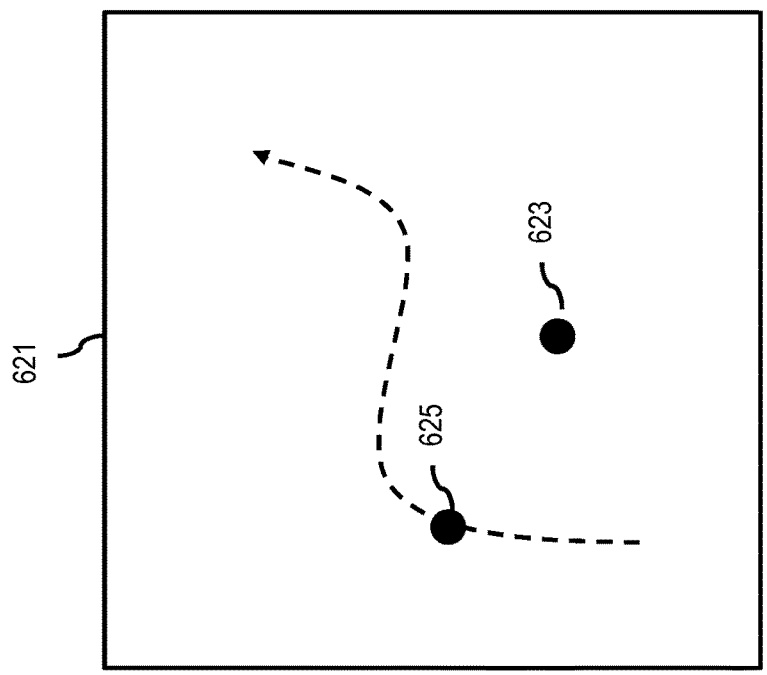
Figure 6C:
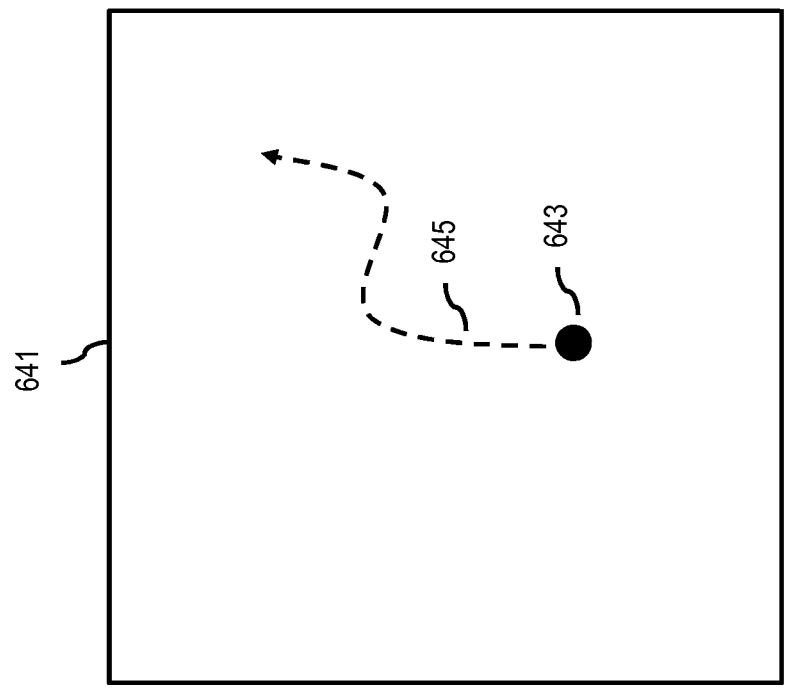

FIGS. 6A-6C are diagrams illustrating the process for providing location sharing via simulation, according to various embodiments. FIG. 6A illustrates a user interface 601 that presents a rendering of a position plan including a starting point 603 and an algorithm for determining a predicted route 605 of the user from the starting point. In this example, the user interface 601 represents a mapping display of either a sharing UE 101 or a receiving UE 101. As show, the UE 101 can render the starting point and then calculated the predicted route 605 for rendering. Because the UE 101 renders the predicted location, the UE 101 can smoothly render the predicted route 605.

In one embodiment, no additional location updates transmissions are needed from the sharing UE 101 unless there is a deviation. FIG. 6B illustrates a user interface 621 that presents a rendering of a position plan in which the actual location 623 of the sharing UE 101 deviates from the predicted location 623 of the sharing UE 101. In this case, the deviation is greater than a predetermined accuracy criterion for determining the deviation. As a result, the sharing UE 101 initiates a transmission of an updated position plan as shown in FIG. 6C.

FIG. 6C illustrates a user interface 641 that presents a rendering of an updated position plan in which the sharing UE 101 has includes a new starting location point 643 that results in a new predicted route 645. In this example, the new position plan remains valid until another deviation of the actual position from the predicted position is shown.

The processes described herein for providing location sharing via simulation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
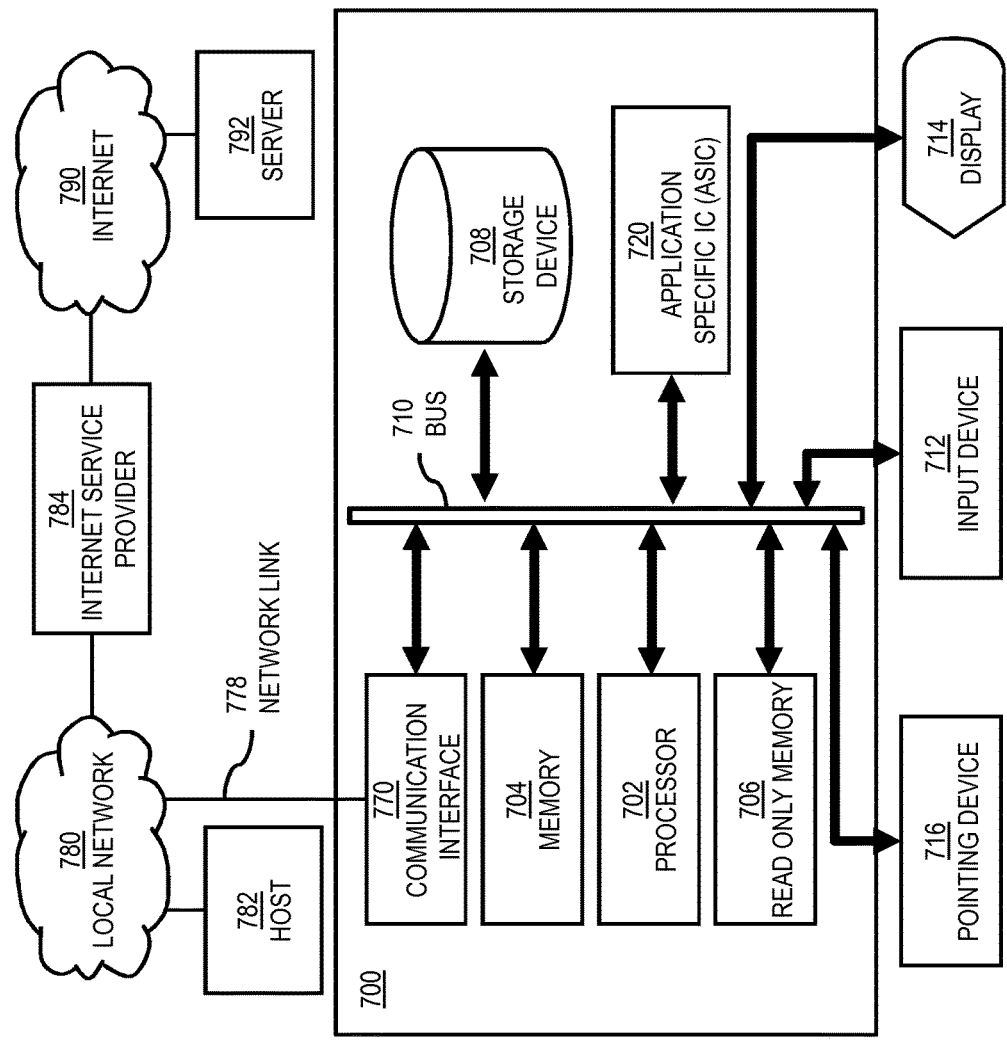
FIG. 7 is a diagram of hardware that can be used to implement embodiments of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide location sharing via simulation as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing location sharing via simulation.

A bus 710 includes one or more parallel conductors of information so that information is transferred quickly among devices coupled to the bus 710. One or more processors 7702 for processing information are coupled with the bus 710.

A processor (or multiple processors) 702 performs a set of operations on information as specified by computer program code related to providing location sharing via simulation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing location sharing via simulation. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing location sharing via simulation, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710.

Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing location sharing via simulation to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide location sharing via simulation as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing location sharing via simulation.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 709. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide location sharing via simulation. The memory 805 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing location sharing via simulation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing location sharing via simulation. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide location sharing via simulation. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising facilitating a processing of and/or processing (1) data and/or (2) information and/or (3) at least one signal, the (1) data and/or (2) information and/or (3) at least one signal based on the following:
    a determination of a location point associated with a first device and an algorithm for determining a predicted route of the first device based on the location point; and
    a transmission of the location point and the algorithm to a second device, the second device comprising a location sharing platform that generates location tracking information based on the location point and the algorithm transmitted by the first device.

2. A method of claim 1, wherein the (1) data and/or (2) information and/or (3) at least one signal are further based on the following:
    a processing of the location point and the algorithm to determine the predicted route;
    a determination of at least one deviation of a current location point of the first device from the predicted route; and
    a transmission of an update of the location point, the algorithm, or a combination thereof based on the current location point.

3. A method of claim 2, wherein the (1) data and/or (2) information and/or (3) at least one signal are further based on the following:
    a determination that the at least one deviation is caused by a stop, a detour, or a combination thereof of the first device; and
    an estimation of a duration of the stop, the detour, or a combination based on contextual information associated with the stop, the detour, or a combination thereof, wherein the update of the location point, the algorithm, or a combination thereof is based on the estimation of the duration.

4. A method of claim 1, wherein the (1) data and/or (2) information and/or (3) at least one signal are further based on the following:
an update of the location point, the algorithm, or a combination thereof at a predetermined frequency, according to a schedule, on demand, or a combination thereof.

5. A method of claim 1, wherein the (1) data and/or (2) information and/or (3) at least one signal are further based on the following:
contextual information associated with the first device, a user associated with the first device, or a combination thereof; and
a determination of the algorithm based on the contextual information.

6. A method of claim 4, wherein the contextual information includes mode of travel information, travel history information, user behavior information, traffic information, crowd-sourced information, or a combination thereof.

7. A method of claim 5, wherein the (1) data and/or (2) information and/or (3) at least one signal are further based on the following:
a determination that the mode of travel information indicates that the first device is using a schedule-based mode of travel; and
a determination of one or more travel schedules for the schedule-based mode of travel as a parameter of the algorithm.

8. A method of claim 1, wherein the (1) data and/or (2) information and/or (3) at least one signal are further based on the following:
one or more endpoints of the predicted route;
an estimation of at least one arrival time at the one or more endpoints; and
an update of the location tracking information, the location point, the algorithm, or a combination thereof based on the estimation of the at least one arrival time.

9. A method of claim 1, wherein the (1) data and/or (2) information and/or (3) at least one signal are further based on the following:
a synchronization of a processing of the location point, the algorithm, or a combination thereof between the first device and the second device.

10. A method of claim 1, wherein the (1) data and/or (2) information and/or (3) at least one signal are further based on the following:
a processing of the location point and the algorithm to determine one or more predicted location points for the first device at one or more time points;
a generation of a position plan specifying the location point, the one or more predicted location points, or a combination thereof; and
a transmission of the position plan to the second device for generating the location tracking information in place of or in addition to the algorithm.

11. An apparatus comprising:
a processor; and
a memory including computer program code for one or more programs,
the memory and the computer program code configured to, with the processor, cause the apparatus to perform at least the following,
determine a location point associated with a first device and an algorithm for determining predicted route of the first device based, at on the location point; and
cause a transmission of the location point and the algorithm to a second device, the second device comprising a location sharing platform that generates location tracking information based on the location point and the algorithm transmitted by the first device.

12. An apparatus of claim 11, wherein the apparatus is further caused to:
process and/or facilitate a processing of the location point and the algorithm to determine the predicted route;
determine a deviation of a current location point of the first device from the predicted route; and
cause a transmission of an update of the location point, the algorithm, or a combination thereof based on the current location point.

13. An apparatus of claim 12, wherein the apparatus is further caused to:
determine that the deviation is caused by a stop, a detour, or a combination thereof of the first device; and
cause an estimation of a duration of the stop, the detour, or a combination based on contextual information associated with the stop, the detour, or a combination thereof, wherein the update of the location point, the algorithm, or a combination thereof based on the estimation of the duration.

14. An apparatus of claim 11, wherein the apparatus is further caused to:
cause an update of the location point, the algorithm, or a combination thereof at a predetermined frequency, according to a schedule, on demand, or a combination thereof.

15. An apparatus of claim 11, wherein the apparatus is further caused to:
determine contextual information associated with the first device, a user associated with the first device, or a combination thereof; and
determine the algorithm based on the contextual information.

16. An apparatus of claim 14, wherein the contextual information includes mode of travel information, travel history information, user behavior information, traffic information, crowd-sourced information, or a combination thereof.

17. An apparatus of claim 15, wherein the apparatus is further caused to:
determine that the mode of travel information indicates that the first device is using a schedule-based mode of travel; and
determine one or more travel schedules for the schedule-based mode of travel as a parameter of the algorithm.

18. An apparatus of claim 11, wherein the apparatus is further caused to:
determine one or more endpoints of the predicted route;
cause an estimation of at least one arrival time at the one or more endpoints; and
cause an update of the location tracking information, the location point, the algorithm, or a combination thereof based on the estimation of the arrival time.

19. An apparatus of claim 11, wherein the apparatus is further caused to:
cause a synchronization of a processing of the location point, the algorithm, or a combination thereof between the first device and the second device.

20. An apparatus of claim 11, wherein the apparatus is further caused to:
process and/or facilitate a processing of the location point and the algorithm to determine one or more predicted location points for the first device at one or more time points;

cause a generation of a position plan specifying the location point, the one or more predicted location points, or a combination thereof; and cause a transmission of the position plan to the second device for generating the location tracking information in place of or in addition to the algorithm.

\* \* \* \* \*